(12) United States Patent
Katayama et al.

(10) Patent No.: US 6,380,287 B2
(45) Date of Patent: *Apr. 30, 2002

(54) POLYCARBONATE COMPOSITIONS

(75) Inventors: Masahiro Katayama; Hiromitsu Hamano, both of Osaka (JP)

(73) Assignee: Daicel Chemical Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/385,952

(22) Filed: Aug. 30, 1999

Related U.S. Application Data

(62) Division of application No. 08/790,746, filed on Jan. 27, 1997, now Pat. No. 6,066,686.

(30) Foreign Application Priority Data

Jul. 5, 1996 (JP) .............................. 8-195583
Oct. 8, 1996 (JP) .............................. 8-267315

(51) Int. Cl.$^7$ .............................. C08L 69/00
(52) U.S. Cl. .............. 524/127; 524/141; 524/143; 525/67; 525/92 D; 525/92 E
(58) Field of Search ............... 524/141, 143, 524/127; 525/67, 92 D, 92 E

(56) References Cited

U.S. PATENT DOCUMENTS 5,539,030 A * 7/1996 Laughner
5,643,981 A * 7/1997 Yang
5,741,838 A * 4/1998 Fuhr
5,900,446 A * 5/1999 Nishihaa

FOREIGN PATENT DOCUMENTS

| DE | 4200247 | * 7/1993 |
| EP | 700968 | * 3/1996 |
| WO | 95/35346 | * 12/1995 |

* cited by examiner

Primary Examiner—David J. Buttner
(74) Attorney, Agent, or Firm—Flynn, Thiel, Boutell & Tanis, P.C.

(57) ABSTRACT

The present invention aims at modifying a polyblend mainly comprising a polycarbdnate resin and a polystyrene resin into a thermoplastic resin composition having flowability and impact strength equivalent to those of a polyblend comprising a polycarbonate resin and an ABS resin, and at providing a harmless flame-retardant thermoplastic resin composition based-on the resulting modified composition. Specifically, the present invention relates to a thermoplastic resin comprising 100 parts by weight of a-resin mixture comprising 30 to 95% by weight of a polycarbonate resin (a), 5 to 70% by weight of a polystyrene resin (b), 0.5 to 20 parts by weight of a specific block copolymer (c) and, if necessary, 0.1 to 20 parts by weight of a polyalkylene terephthalate (d), and/or 0.1 to 20 parts by weight of a polyphenylene ether resin (e), and a flame-retardant thermoplastic resin composition prepared by blending the above composition with 1 to 40 parts by weight of an organophosphorus compound (f) and, if necessary, 0.05 to 5 parts by weight of a fluoroethylene polymer (g).

5 Claims, No Drawings

POLYCARBONATE COMPOSITIONS

This is a division of Ser. No. 08/790 746, filed Jan. 27, 1974 now U.S. Pat. No. 6,066,686.

TECHNICAL FIELD TO WHICH THE INVENTION BELONGS

The present invention relates to a thermoplastic resin composition useful as the material for the housing, chassis or other members of office automation machines, communication apparatus or domestic electrical appliances or for automobile members. In particular, the present invention relates to a thermoplastic resin composition mainly comprising a polycarbonate resin and a polystyrene resin and having excellent processability, impact resistance and heat stability, and a flame-retardant resin composition based on the above thermoplastic resin composition.

PRIOR ART

Polycarbonate resins are widely used in industrial fields by virtue of their excellent mechanical characteristics and thermal properties. However, the resins have poor processability during molding, particularly in flowability, so that many polyblends of polycarbonate resins with other thermoplastic resins have been developed. Among such polyblends, polyblends thereof with acrylonitrile-butadiene-styrene (ABS) resins have been widely used in the fields of automobiles and office automation machines, the electronic and electrical fields and so on, for the purposes of improving the flowability and lowing the cost. On the other hand, polyblends thereof with polystyrene are seldom used now because of their poor mechanical characteristics due to poor compatibility.

Meanwhile, the synthetic resin materials to be used in the fields of office automation machines, domestic electrical appliances and so on are further required to have excellent flame retardance, so that halogenated flame retardants (such as brominated or chlorinated ones) are frequently used as the external flame retardants for the materials. Such flame retardants have a disadvantage of generating corrosive or toxic gas during processing or burning, though they have a relatively excellent flame retarding effect. Under recent circumstances, where the interest in environmental problems has been increasing, as a means for overcoming this disadvantage, it has been expected to develop a flame-retardant resin without using a compound containing a halogen (such as bromine or chlorine).

DISCLOSURE OF THE INVENTION

The present invention aims at modifying a polyblend mainly comprising a polycarbonate resin and a polystyrene resin into a thermoplastic resin having a flowability and impact strength equivalent to those of a polyblend comprising a polycarbonate resin and an ABS resin, and at providing a harmless flame-retardant thermoplastic resin composition based on the resulting modified composition.

The inventors of the present invention have intensively studied to find that a resin composition prepared by combining a polycarbonate resin with a rubber-modified polystyrene resin and adding at least one member selected from the group consisting of (I) block copolymers (C), wherein both a polymeric block (A) mainly made from an aromatic vinyl compound and a polymeric block (B) mainly made from a conjugated diene compound are present in each molecule, and/or partially hydrogenated derivatives thereof (D), (II) epoxidized block copolymers (E) derived from the block copolymers (C) and/or the partially hydrogenated derivatives (D), epoxidized, through the epoxidation of double bonds resulting from the conjugated diene compound, and (III) acid-modified block copolymers (F) derived from the block copolymers (C) and/or the partially hydrogentated derivatives (D) to the resulting combination is remarkably improved in compatibility and has an excellent flowability and impact strength and that a resin composition prepared by further adding an organophosphorus compound and a fluoroethylene polymer to the above resin composition is remarkably improved in flame retardance and impact resistance and is superior to polyblends of polycarbonate resins with acrylonitrile-butadiene-styrene (ABS) resins in flowability. The above longstanding problem has been solved by these findings to thereby accomplish the present invention.

The present invention relates to a thermoplastic resin composition comprising 100 parts by weight of a resin mixture comprising 30 to 95% by weight of a polycarbonate resin (a) and 5 to 70% by weight of a polystyrene resin (b), and 0.5 to 20 parts by weight of at least one member (c) selected from the group consisting of (I) block copolymers (C), wherein both a polymeric block (A) mainly made from an aromatic vinyl compound and a polymeric block (B) mainly made from a conjugated diene compound are present in each molecule, and/or partially hydrogenated derivatives thereof (D), (II) epoxidized block copolymers (E) derived from the block copolymers (C) and/or the partially hydrogenated derivatives (D), epoxidized through the epoxidation of double bonds resulting from the conjugated diene compound, and (III) acid-modified block copolymers (F) derived from the block copolymers (C) and/or the partially hydrogenated derivatives (D).

The present invention includes the following preferred embodiments. Namely, the present invention also relates to the above thermoplastic resin composition wherein the component (b) is a rubber-modified polystyrene resin satisfying the following requirements 1) to 3):

1) the content of rubber in the rubber-modified polystyrene resin is 15 to 25% by weight,
2) the volume mean particle diameter of rubber contained in the rubber-modified polystyrene resin is 0.3 to 5.0 $\mu$m, and
3) the gel content of the rubber-modified polystyrene resin is 15 to 70% by weight.

Further, the present invention relates to a thermoplastic resin composition as described above which comprises 10 to 94.9% by weight of the component (a), 5 to 70% by weight of the component (b) and 0.1 to 20% by weight of an aromatic polyester and in which the component (c) is at least one member selected from among the epoxidized block copolymers (II).

The above composition may further contain 0.1 to 20 parts by weight of a polyalkylene terephthalate (d), 0.1 to 20 parts by weight of a polyphenylene ether resin (e), 1 to 40 parts by weight of an organophosphorus compound (f), 0.05 to 5 parts by weight of a fluoroethylene polymer (g) and/or 1 to 150 parts by weight of a flame retardant (i).

An embodiment according to the present invention provides a thermoplastic resin composition comprising 100 parts by weight of a resin mixture comprising 30 to 95% by weight of a polycarbonate resin (a) and 5 to 70% by weight of a rubber-modified polystyrene resin (b) satisfying the following requirements 1) to 3):

1) the content of rubber in the rubber-modified polystyrene resin is 15 to 25% by weight, 2) the volume mean particle diameter of rubber contained in the rubber-modified polystyrene resin is 0.3 to 5.0 μm, and 3) the gel content of the rubber-modified polystyrene resin is 15 to 70% by weight, 0.5 to 20 parts by weight of at least one member (c) selected from the group consisting of (I) block copolymers (C), wherein both a polymeric block (A) mainly made from an aromatic vinyl compound and a polymeric block (B) mainly made from a conjugated diene compound are present in each molecule, and/or partially hydrogenated derivatives thereof (D), (II) epoxidized block copolymers (E) derived from the block copolymers (C) and/or the partially hydrogenated derivatives (D), epoxidized through the epoxidation of double bonds resulting from the conjugated diene compound, and (III) acid-modified block copolymer (F) derived from the block copolymers (C) and/or the partially hydrogentated derivatives (D), and, if necessary, 0.1 to 20 parts by weight of a polyalkylene terephthalate (d) and/or 0.1 to 20 parts by weight of a polyphenylene ether resin (e).

Further, the present invention also provides a flame-retardant thermoplastic resin composition comprising the above thermoplastic resin composition, 1 to 40 parts by weight of an organophosphorus compound and, if necessary, 0.05 to 5 parts by weight of a fluoroethylene polymer.

The present invention will now be described in detail.

The term "polycarbonate resin" used in this description for the component (a) refers to a resin prepared by reacting a dihydric phenol with a carbonate precursor by a solution method or a melting method.

Representative examples of the dihydric phenol to be desirably used in the preparation of the resin include 2,2-bis(4-hydroxyphenyl)propane (i.e., bisphenol A), bis(4-hydroxyphenyl)methane, 1,1-bis(4-hydroxyphenyl)ethane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)propane, bis(4-hydroxyphenyl) sulfide and bis(4-hydroxyphenyl) sulfone. Bis(4-hydroxyphenyl)-alkane type dihydric phenols are more desirable, with bisphenol A being the most desirable.

On the other hand, preferable examples of the carbonate precursor include carbonyl halides, carbonyl esters and haloformates, and specific examples thereof include phosgene, diphenyl carbonate, dihaloformates of dihydric phenols and mixtures of them.

In preparing the polycarbonate resin, one or more of the above dihydric phenols may be used. Further, a mixture of two or more of the polycarbonate resins thus prepared may be used.

The polystyrene resin to be used in the present invention as the component (b) may be a polymer prepared by polymerizing an aromatic vinyl monomer or a polymer prepared by modifying the polymer with a rubber. Examples of the aromatic vinyl monomer used as the unsaturated monomer include styrene, methylstyrene, halostyrenes and vinyltoluene. The process for preparing the polystyrene resin is not particularly limited but may be any known one such as bulk polymerization, solution polymerization, suspension polymerization or emulsion polymerization. Preferable examples of the polystyrene resin include polystyrene (GPPS) and high-impact polystyrene (HIPS).

The term "rubber-modified polystyrene resin" used in this description for the component (b) refers to a polymer comprising a matrix made of an aromatic vinyl polymer and a rubber dispersed in the matrix as particles, which can be prepared by polymerizing a monomer mixture comprising an aromatic vinyl monomer in the presence of a rubber by a known bulk, bulk-suspension, solution or emulsion polymerization process. Examples of the rubber include a low-cis type polybutadiene, a high-cis type polybutadiene and styrene-butadiene copolymers, which may be commercially available ones. Further, two or more of these polymers may be used simultaneously. Examples of the aromatic vinyl monomer include styrene; ring-alkylated styrenes such as o-methylstyrene, p-methylstyrene, m-methylstyrene, 2,4-dimethylstyrene and p-t-butylstyrene; and (α-alkylstyrenes such as α-methylstyrene. These monomers may each be used alone or as a mixture of two or more of them.

The rubber-modified polystyrene resin is particularly preferred to satisfy the following requirements.

The content of rubber in the rubber-modified polystyrene resin is preferably within a range of 15 to 25% by weight. When the content is less than 15% by weight, the polyblend of the resulting rubber-modified polystyrene resin with a polycarbonate resin will have a poor impact resistance. On the other hand, when it exceeds 25% by weight, the blend will have a very poor flowability (processability in molding) and the equipment for preparing the blend will be severely burdened by an increase in the stirring power or conveying pressure. Further, the rubber-modified polystyrene resin may be mixed with a polymer made from an aromatic vinyl monomer and not contain any rubber.

The volume mean particle diameter of rubber contained in the rubber-modified polystyrene resin is preferably within a range of 0.3 to 5.0 μm. When the volume mean particle diameter is outside this range, the polyblend of the resulting rubber-modified polystyrene resin with a polycarbonate resin will have an unfavorably poor impact resistance and surface impact strength. The volume mean particle diameter can be determined by the use of a 3 wt % solution of a rubber-modified polystyrene resin in methyl ethyl ketone and a particle size distribution analyzer of the laser diffraction-scattering type (for example, LA-700 mfd. by Horiba Seisakusho was used in the Examples which will be described below)

The gel content of the rubber-modified polystyrene resin is preferably within a range of 15 to 70% by weight. When the gel content is less than 15% by weight, the blend of the resulting rubber-modified polystyrene resin with a polycarbonate resin will have an unfavorably poor impact resistance and surface impact strength, while when it exceeds 70% by weight, its flowability (processability during molding) will be very poor. The term "gel content" used in this description refers to the content of toluene insolubles as found in dissolving a rubber-modified polystyrene resin in toluene.

The term "aromatic polyester" used in this description for the component (h) refers to a polyester having aromatic rings in units of the polymeric chain, which is a homopolymer or copolymer prepared mainly from an aromatic dicarboxylic acid (or an ester-forming derivative thereof) and a diol (or an ester-forming derivative thereof) through condensation. Examples of the aromatic dicarboxylic acid include benzene ring bearing dicarboxylic acids such as terephthalic acid and isophthalic acid; naphthalene ring bearing ones such as naphthalene-1,5-dicarboxylic acid and naphthalene-2,6-dicarboxylic acid; and ester-forming derivatives of them. Further, at most, 20 mole % of the acid component may be replaced by a dicarboxylic acid other than the aromatic dicarboxylic acids or an ester-forming derivative thereof (for example, adipic acid or sebacic acid).

Examples of the diol component include aliphatic glycols such as ethylene glycol, trimethylene glycol, 1,4-butanediol, hexamethylene glycol, diethylene glycol and cyclohexanediol; aromatic diols such as 1,4-bis(2-hydroxyethoxy) benzene and bisphenol A; and ester-forming derivatives thereof. Preferable examples of the aromatic polyester include polyethylene terephthalate, polytrimethylene terephthalate, poly(1,4-cyclohexanedimethylene terephthalate), polybutylene terephthalate and copolymers of them, with polybutylene terephthalate being particularly preferable. It is generally preferable to use an aromatic polyester having an intrinsic viscosity of 0.5 to 1.6 (as determined by the use of o-chlorophenol as solvent at 25° C.).

Detailed description will now be given on component (c), i.e., (I) block copolymers (C), wherein both a polymeric block (A) mainly made from an aromatic vinyl compound and a polymeric block (B) mainly made from a conjugated diene compound are present in each molecule, and/or partially hydrogenated derivatives thereof (D), (II) epoxidized block copolymers (E) derived from the block copolymers (C) and/or the partially hydrogenated derivatives (D) through the epoxidation of double bonds resulting from the conjugated diene compound, and (III) acid-modified block copolymers (F) derived from the block copolymers (C) and/or the partially hydrogentated derivatives (D).

Examples of the aromatic vinyl compound from which the polymeric block (A) constituting the block polymer (C) is mainly made include styrene, α-methylstyrene, vinyltoluene, p-t-butylstyrene, divinylbenzene, p-methylstyrene and 1,1-diphenylstyrene, among which styrene is preferably used. Further, these compounds may be used each alone or as a mixture of two or more of them.

Examples of the conjugated diene compound from which the polymeric block (B) constituting the block copolymer (C) is mainly made include butadiene, isoprene, 1,3-pentadiene, 2,3-dimethyl-1,3-butadiene, piperylene, 3-butyl-1,3-octadiene and phenyl-1,3-butadiene. These compounds may be used each alone or as a mixture of two or more of them. Among the compounds, butadiene, isoprene and mixtures of them are preferable.

The block copolymer (C) is characterized in that both a polymeric block (A) mainly made from an aromatic vinyl compound and a polymeric block (B) mainly made of a conjugated diene compound are present in each molecule. It is preferable that the weight ratio of the aromatic vinyl compound to the conjugated diene compound lie between 5/95 and 70/30, still preferably between 10/90 and 60/40.

The molecular structure of the block copolymer (C) may be any one selected from among linear, branched and radial structures or any combination of two or more of them. Examples of the molecular structure include A-B-A, B-A-B-A, (A-B-)$_4$Si and A-B-A-B-A wherein A and B means the polymeric blocks (A) and (B) respectively. Further, the component (c) may be one derived from the block copolymer (C) through the partial or complete hydrogenation of double bonds resulting from the conjugated diene compound, i.e., the derivative (D).

It is preferable that the number-average molecular weight of the block copolymer (C) be 5,000 to 600,000, still preferably 10,000 to 500,000. Further, it is preferable that the molecular weight distribution [ratio of weight-average molecular weight (Mw) to number-average molecular weight (Mn), i.e., Mw/Mn] be 10 or below. When the number-average molecular weight and molecular weight distribution of the block copolymer (C) fall within these ranges respectively, the block copolymer (C) can exhibit suitable compatibility with the other components.

The epoxidized block copolymer (E) is prepared by reacting the above block copolymer (C) and/or the partially hydrogenated derivative (D) with an epoxidizing agent such as hydroperoxide or a peroxy acid in an inert solvent. Although the amount of the epoxidizing agent to be used in the above epoxidation is not strictly limited and may be suitably selected depending upon the kind of the epoxidizing agent used, the desired degree of epoxidation and the kind of block copolymer (C) used as starting material, it is preferable to select the amount of the epoxidizing agent within such a range that the epoxy equivalent of the finally obtained epoxidized block copolymer (E) falls within a range of 140 to 2700, still preferably within a range of 200 to 2000. The term "epoxy equivalent" used in this description refers to a value which is calculated by the equation: epoxy equivalent=1600/{oxirane oxygen content (wt%) of epoxidized block copolymer} and which corresponds to the weight of epoxidized block copolymer per mol of oxirane oxygen. Incidentally, the oxirane oxygen content is determined by titration using a solution of hydrogen bromide in acetic acid. A higher epoxy equivalent means a lower oxirane oxygen content, while a lower epoxy equivalent means a higher oxirane oxygen content. When the epoxy equivalent is less than 140, the resulting block copolymer will unfavorably barely exhibit elastic properties, while when it exceeds 2700, the resulting block copolymer will unfavorably barely exhibit unique physical properties due to the epoxidation.

The acid-modified block copolymer (F) is prepared by partially modifying the above block copolymer (C) and/or the partially hydrogenated derivative (D) with a carboxylic acid, particularly carboxylic acid anhydride (such as maleic anhydride).

The term "polyalkylene terephthalate" used in this description for the component (d) refers to a product of reaction of an aromatic dicarboxylic acid or a reactive derivative thereof (such as dimethyl ester or anhydride) with an aliphatic, alicyclic or aromatic diol or a mixture of two or more of such products. The polyalkylene terephthalate can be prepared by conventional processes.

In general, terephthalic acid or dimethyl terephthalate is used as the aromatic dicarboxylic acid or the reactive derivative thereof. According to the present invention, however, the dicarboxylic acid component may contain, in addition to terephthalic acid, one or more members selected from the group consisting of other $C_8$–$C_{14}$ aromatic and alicyclic dicarboxylic acids and $C_4$–$C_{12}$ aliphatic dicarboxylic acids, while specific examples of the dicarboxylic acid to be used additionally include phthalic acid, isophthalic acid, 2,6-naphthalenedicarboxylic acid, 4,4-diphenyldicarboxylic acid, succinic acid, adipic acid, sebacic acid, azelaic acid and cyclohexane-diacetic acid.

The diol component generally comprises at least one member selected from the group consisting of ethylene glycol, 1,4-butanediol and 1,4-cyclohexane-dimethylol. The diol component may further contain one or more members selected from the group consisting of other $C_3$–$C_{12}$ aliphatic diols and $C_6$–$C_{21}$ alicyclic diols in addition to the above diol compound, while specific examples of the diol to be used additionally include 1,3-propanediol, 2-ethyl-1,3-propanediol, neopentyl glycol, 1,5-pentanediol, 1,6-hexanediol, cyclohexane-1,4-dimethylol, 3-ethyl-2,4-pentanediol, 2-methyl-2,4-pentanediol, 2,2,4-trimethyl-1,4-pentanediol, 2,2,4-trimethyl-1,5-pentanediol, 2-ethyl-1,3-hexanediol, 2,2-diethyl-1,3-propanediol, 2,5-hexanediol, 1,4-di(β-hydroxyethoxy)benzene, 2,2-bis(4-hydroxycyclohexyl)-propane, 2,4-dihydroxy-1,1,3,3-tetramethylcyclobutane, 2,2-bis(3-β-hydroxyethoxyphenoxy)propane and 2,2-bis(4-hydroxypropylphenyl)propane.

The polyalkylene terephthalate may be a branched one wherein a relatively small amount of a trihydric or tetrahydric alcohol or a tribasic or tetrabasic carboxylic acid is incorporated. The branched polyalkylene terephthalate is preferably one wherein one or more members selected from the group consisting of trimesic acid, trimellitic acid, trimethylolethane, trimethylolpropane and pentaerythritol are incorporated.

Preferable examples of the polyalkylene terephthalate include polyethylene terephthalate, polybutylene terephthalate, poly(1,4-cyclohexane-dimethylene terephthalate) and copolymers of them.

The term "polyphenylene ether resin" used in this description for the component (e) refers to a homopolymer or copolymer comprising repeating units represented by the following general formulae (I) and/or (II):

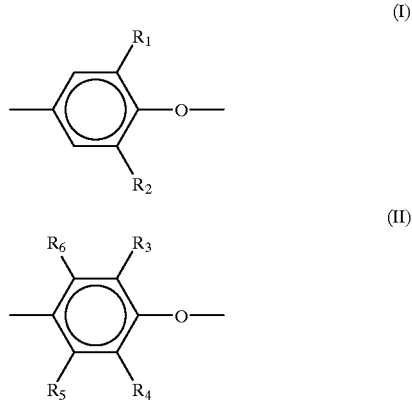

wherein $R_1$, $R_2$, $R_3$, $R_4$, $R_5$ and $R_6$ are each independently $C_1$–$C_4$ alkyl, aryl or hydrogen, with the proviso that the cases wherein both $R_5$ and $R_6$ are simultaneously hydrogen are excepted.

Representative examples of the polyphenylene ether homopolymer include poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether and poly(2-methyl-6-hydroxyethyl-1,4-phenylene) ether, among which poly(2,6-dimethyl-1,4-phenylene) ether is particularly preferable.

The polyphenylene ether copolymer may have a phenylene ether structure as the main monomeric unit. Examples thereof include 2,6-dimethylphenol/2,3,6-trimethylphenol copolymer, 2,6-dimethylphenol/o-cresol copolymer and 2,6-dimethylphenol/2,3,6-trimethylphenol/o-cresol copolymer.

The organophosphorus compound (f) to be used in the present invention is not particularly limited, but may be any organic compound having a phosphorus atom. It is preferable to use an organophosphorus compound having at least one ester oxygen atom directly bonded to the phosphorus atom. This component not only imparts flame retardance to the thermoplastic resin composition of the present invention but also is effective in improving the impact resistance of the composition.

Examples of the organophosphorus compound usable in the present invention include orthophosphates such as trimethyl phosphate, triethyl phosphate, tributyl phosphate, tri(2-ethylhexyl) phosphate, tributoxyethyl phosphate, trioleyl phosphate, triphenyl phosphate, tricresyl phosphate, trixylenyl phosphate, tris(isopropylphenyl) phosphate, tris(o-phenylphenyl) phosphate, tris(p-phenylphenyl) phosphate, trinaphthyl phosphate, cresyl diphenyl phosphate, xylenyl diphenyl phosphate, diphenyl (2-ethylhexyl) phosphate, di(isopropylphenyl) phenyl phosphate, o-phenylphenyl dicresyl phosphate, dibutyl phosphate, monobutyl phosphate, di(2-ethylhexyl) phosphate, monoisodecyl phosphate, acid 2-acryloyloxyethyl phosphate, acid 2-methacryloyloxyethyl phosphate, diphenyl 2-acryloyloxyethyl phosphate and diphenyl 2-meth-acryloyloxyethyl phosphate; and condensates of these phosphates, among which triphenyl phosphate is particularly preferable.

The organophosphorus compound usable in the present invention also includes-phosphites such as triphenyl phosphito, trisnonylphenyl phosphite, tristridecyl phosphite and dibutyl hydrogen phosphite; and condensates of these phosphites. Other examples of the organophosphorus compound include triphenylphosphine oxide, tricresylphosphine oxide, diphenyl methanephosphonate and diethyl phenylphosphonate.

These organophosphorus compounds may each be used alone or as a mixture of two or more of them.

It is desirable that the fluoroethylene polymer (g) to be used in the present invention is a high-molecular one having an Mn value of 10,000 or above and a glass transition temperature of −30° C. or above, more desirably 100° C. or above. The fluorine content of the polymer (g) is preferably 65 to 76% by weight, still preferably 70 to 76% by weight. Further, it is preferable that the polymer (g) have a mean particle diameter of 0.05 to 1,000 μm, still preferably 0.08 to 20 μm, and a density of 1.2 to 2.3 g/cm³.

Preferable examples of the fluoroethylene polymer include polytetrafluoroethylene, polyvinylidene fluoride, tetrafluoroethylenehexafluoropropylene copolymer and ethylenetetrafluoroethylene copolymer, among which polytetrafluoroethylene is particularly preferable. These polymers may each be used alone or as a mixture of two or more of them.

The term "flame-retardant" used for the component (i) includes known flame-retardants, organic or inorganic compounds having flame retardance or self-extinguishing characteristics. Examples of the organic flame-retardant include organophosphorus compounds, phosphorus-halogen compounds, and fluoroethylene polymers. Examples of the inorganic flame-retardant include hydroxides of aluminum or magnesium, an antimony compound, zinc borate, and an zirconium compound. To avoid corrosive or toxic gas from being generating during processing or burning, it is preferable to select the flame-retardant without using any compound containing halogen (such as bromine and chlorine). Preferable examples of the flame-retardant include organophosphorus compounds and fluoroethylene polymers.

The proportions of the components in the thermoplastic resin composition according to the present invention will now be described.

The amounts of the polycarbonate resin (a) and the rubber-modified polystyrene resin (b) to be used will first be described. The amount of the polycarbonate resin (a) to be used is 30 to 95% by weight, preferably 50 to 90% by weight, still preferably 60 to 80% by weight based on the resin mixture comprising the polycarbonate resin (a) and the rubber-modified polystyrene resin (b) (hereinafter referred to as "PC-HIPS resin composition"). When the amount of the resin (a) is less than 30% by weight, the thermal deformation temperature will be too low, while when it exceeds 95% by weight, the processability during molding will be poor.

The amount of the rubber-modified polystyrene resin (b) to be used is 5 to 70% by weight, preferably 10 to 50% by weight, still preferably 20 to 40% by weight based on the PC-HIPS resin composition. When the amount of the resin (b) is less than 5% by weight, the processability during molding will be poor, while when it exceeds 70% by weight, the thermal deformation temperature will be too low.

The proportions of the components in the thermoplastic resin composition according to the present invention will now be described. The amount of the polycarbonate resin (a) to be used is 10 to 94.9% by weight, preferably 50 to 90% by weight, still preferably 60 to 80% weight based on the resin mixture comprising the polycarbonate resin (a), the polystyrene resin (b) and the aromatic polyelter (h) (hereinafter referred to as "PC-PS-APES resin composition"). When the amount of the resin (a) is less than 10% by weight, the thermal deformation temperature will be too low, while when it exceeds 94.9% by weight, the processability in molding will be poor.

The amount of the aromatic polyester (h) to be used is 0.1 to 20% by weight, preferably 0.5 to 10% by weight, still preferably 1 to 5% by weight based on the PC-PS-APES resin composition. When the amount of the resin (h) is less than 0.1% by weight, the strength will be poor, while when it exceeds 20% by weight based on the PC-PS-APES resin composition, the strength will be too low.

Then, the amount of the component (c) selected from the block copolymers (C) to (F) is 0.5 to 20 parts by weight, preferably 1 to 5 parts by weight per 100 parts by weight of the PC-HIPS resin composition. When the amount of the component (c) is less than 0.5 part by weight, the effect of improving the compatibility of a polycarbonate resin with the rubber-modified polystyrene resin will be insufficient and yield a thermoplastic resin composition having poor mechanical characteristics. On the other hand, when it exceeds 20 parts by weight, the flame retardance will be affected adversely and the flexural modulus and the thermal deformation temperature will be lowered.

The amount of polyalkylene terephthalate to be used as component (d) is 0.1 to 20 parts by weight, preferably 0.5 to 5 parts by weight, per 100 parts by weight of the PC-HIPS resin composition. Although the addition of a polyalkylene terephthalate is not essential to the present invention, it is effective in enhancing the compatibility of a polycarbonate resin with the rubber-modified polystyrene resin to improve the surface impact strength. When the amount exceeds 20 parts by weight, the flame retardance will be affected adversely and the Izod impact strength will be lowered.

The amount of the polyphenylene ether resin to be used as the component (e) is 0.1 to 20 parts by weight, preferably 0.5 to 5 parts by weight per 100 parts by weight of the PC-HTPS resin composition. Although the addition of a polyphenylene ether resin is not essential to the present invention, it is effective in improving the compatibility of a polycarbonate resin with the rubber-modified polystyrene resin to improve the surface impact strength. Further, the addition is effective in improving the flame retardance. When the amount exceeds 20 parts by weight, the Izod surface impact strength will be lowered.

When an organophosphorus compound is added to the thermoplastic resin composition as component (f), the amount thereof is 1 to 40 parts by weight, preferably 5 to 20 parts by weight per 100 parts by weight of the PC-HIPS resin composition. When the amount is less than one part by weight, the flame retarding effect will be insufficient, while when the amount exceeds 40 parts by weight, the resulting flame-retardant thermoplastic resin composition will have poor mechanical characteristics.

A fluoroethylene polymer serves as an auxiliary flame retardant for the above organophosphorus compound and is used as component (g) together with the above organophosphorus compound in the present invention. The amount of the fluoroethylene polymer to be added to the thermoplastic resin composition of the present invention is preferably 0.05 to 5 parts by weight, still preferably 0.1 to 1 part by weight, per 100 parts by weight of the PC-HIPS resin composition. When the amount falls within this range, the dripping due to the plastication of the resins by the added organophosphorus compound can be inhibited sufficiently and the resulting flame retardant resin composition is not impaired in mechanical characteristics. Incidentally, a flame-retardant thermoplastic resin composition exhibiting flame retardance enough for practical use and having excellent flowability and impact resistance can be obtained, even when no fluoroethylene polymer is used.

When a flame-reterdant is added to the thermoplastic resin composition as the component (i), the amount thereof is 1 to 150 parts by weight, preferably 5 to 80 parts by weight, still preferably 10 to 50% by weight per 100 parts by weight of the PC-PS-APES resin composition. When the amount is less than one part by weight, the flame retarding effect will be insufficient, while when the amount exceeds 150 parts by weight, the resulting flame-retardant thermoplastic resin composition will have a poor strength.

The thermoplastic resin composition of the present invention and the flame-retardant thermoplastic resin composition comprising it and a flame retardant can be produced by conventional processes. For example, the composition can be produced by premixing predetermined amounts of necessary components together by the use of a mixing machine such as Henschel mixer, tumbler, blender, kneader or the like, melt-kneading the obtained premix by the use of an-extruder, heated roll, Banbury mixer or the like, and pelletizing or grinding the obtained blend. During such a production, various additives may be added to the polycarbonate resin or the rubber-modified polystyrene resin as needed. Examples of such additives include fillers, lubricants, reinforcements, stabilizers, light stabilizers, ultraviolet absorbers, plasticizers, antistatic agents, hue improvers and so on.

The thermoplastic resin composition and the flame-retardant thermoplastic resin composition according to the present invention have excellent processability during molding, impact resistance, heat stability and flame retardance and can be used as the material for the housing, chassis or other members of office automation machines, communication apparatus or domestic electrical appliances or for automobile members.

As described above, a thermoplastic resin composition which has a remarkably improved compatibility and excellent processability during molding and impact strength can be obtained by adding a specific block copolymer to a polyblend of a polycarbonate resin with a specific rubber-modified polystyrene resin. Further, a novel non-bromine and non-chlorine flame-retardant thermoplastic resin composition which does not generate any corrosive or toxic gas in processing or burning and has an excellent flame retardance, impact resistance and processability during molding can be obtained by adding an organophosphorus compound and a fluoroethylene polymer to the above thermoplastic resin composition.

The present invention makes it possible to use polystyrene as the substitute for an ABS resin for the purpose of modifying a polycarbonate resin, though this use was almost impossible in the prior art. Thus, the present invention has a high technical and economical value.

EXAMPLE

The present invention will now be described in detail by referring to the following Examples, though the present invention is not limited by them. The testing methods will first be described, which were employed in the evaluation experiments made in the following Examples.

(1) Impact strength (unit: kg·cm/cm)

Determined by measuring the Izod impact strength (notched) of a test piece having a thickness of ¼ inch.

(2) Surface impact strength (Du Pont impact strength, unit; kgf·cm)

Determined by the use of 1 mm and 2 mm thick test pieces according to the Du Pont impact strength test wherein the load is 1 kg and the punch diameter is ¼ inch.

(3) Flame retardance (UL94)

Determined by the use of a test piece (bar sample) having a thickness of 1/16 inch according to the vertical flame test (94V-0) as stipulated in UL94 of the UL standards of the United States.

(4) Flowability (unit: mm)

Determined by measuring the distance of flow of each sample in a spiral cavity (flow) [section: 2 mm (thickness)× 20 mm (width)] under the conditions of a cylinder temperature of 250° C., mold temperature of 60° C. and injection pressure of 500 kg/cm$^2$.

First, the Synthesis Examples will be given, which relate to the preparation of the rubber-modified polystyrene resins (b) used in the following Examples.

Synthesis Example 1

10 parts by weight of ethylbenzene and 0.005 part by weight of di-t-butyl peroxide (DTBPO) were dissolved in 100 parts by weight of a solution of 4 parts by weight of a polybutadiene rubber (a product of Nippon Zeon Co., Ltd., BR1220SG) in 96 parts by weight of monomeric styrene to prepare a feed solution. This feed solution was continuously fed into a preheater of the completely stirred mixing tank type and preheated to 100° C. in the preheater. Then, the resulting feed solution was continuously thrown into a first reactor, i.e., a column-type plug flow reactor fitted with a stirrer to conduct polymerization. The polymerization temperature in the first reactor was regulated so as to give such a temperature gradient that the temperature increases along the direction of flow within a range of 100 to 115° C.

Then, the obtained polymerization mixture was continuously thrown into a second reactor, i.e., a static mixer type plug flow reactor, and the polymerization was continued until the conversion of styrene into a polymer reached 82%. The resulting polymerization mixture was thermally treated in a twin-screw extruder at 230° C. with the volatile components being removed under a reduced pressure, followed by pelletization. The obtained rubber-modified polystyrene resin was analyzed. The rubber content was 3.8% by weight, the volume mean particle diameter of rubber was 2.0 μm, and the gel content was 14% by weight. Hereinafter, the rubber-modified polystyrene resin obtained in this synthetic example is referred to as "HIPS-1".

Synthetic Example 2

10 parts by weight of ethylbenzene and 0.03 part by weight of di-t-butyl peroxide (DTBPO) were dissolved in 100 parts by weight of a solution of 13 parts by weight of a polybutadiene rubber (a product of Ube Industries, Ltd., BRZ022) in 87 parts by weight of monomeric styrene to prepare a feed solution. This feed solution was continuously fed into a preheater of the completely stirred mixing tank type and preheated to 100° C. in the preheater. Then, the resulting feed solution was continuously thrown into a first reactor, i.e., a column-type plug flow reactor fitted with a stirrer to conduct polymerization. The polymerization temperature in the first reactor was regulated so as to give such a temperature gradient that the temperature increases along the direction of flow within a range of 100 to 115° C.

Then, the obtained polymerization mixture was continuously introduced into a second reactor, i.e., a static mixer type plug flow reactor, and the polymerization was continued until the conversion of styrene into a polymer reached 77%. The resulting polymerization mixture was thermally treated in a twin-screw extruder at 230° C. with the volatile components being removed under a reduced pressure, followed by pelletization. The obtained rubber-modified polystyrene resin was analyzed. The rubber content was 11.6% by weight, the volume mean particle diameter of rubber was 2.2 μm, and the gel content was 32% by weight. Hereinafter, the rubber-modified polystyrene resin obtained in this synthetic example is referred to as "HIPS-2".

Synthetic Example 3

A rubber-modified polystyrene resin was prepared in the same manner as that of Synthetic Example 2 except that the amounts of the monomeric styrene and the polybutadiene rubber (a product of Ube Industries, Ltd., BRZ022) were changed to 80 parts by weight and 20 parts by weight respectively. This rubber-modified polystyrene resin was analyzed. The rubber content was 19% by weight, the volume-mean particle diameter of the rubber was 1.8 μm, and the gel content was 41% by weight. Hereinafter, the rubber-modified polystyrene resin obtained in this synthesis example is referred to as "HIPS-3".

Synthesis Example 4

A rubber-modified polystyrene resin was prepared in the same manner as that of Synthetic Example 2 except that the amounts of the monomeric styrene and the polybutadiene rubber (a product of Ube Industries, Ltd., BRZ022) were changed to 77 parts by weight and 23 parts by weight respectively. This rubber-modified polystyrene resin was analyzed. The rubber content was 21.5% by weight, the volume-mean particle diameter of rubber was 2.5 μm, and the gel content was 49% by weight. Hereinafter, the rubber-modified polystyrene resin obtained in this synthesis example is referred to as "HIPS-4".

Next, the preparation of an epoxidized block copolymer will be described. The epoxidized block copolymer is one of the components (c) and was used in the following Examples.

Synthesis Example of an epoxidized block copolymer 300 g of a styrene-butadiene-styrene block copolymer [SBS, a product of Japan Synthetic Rubber Co., Ltd., TR2000, Mn: ca. 100,000, styrene/butadiene ratio (by weight): 40/60] and 1500 g of ethyl acetate were charged into a jacketed reactor fitted with a stirrer, a reflux condenser and a thermometer, followed by dissolution. Then, 169 g of a 30 wt % solution of peroxyacetic acid in ethyl acetate was continuously dropped into the reactor to conduct epoxidation at 40° C. under stirring for 3 hours. The reaction mixture was brought to room temperature and taken out of the reactor. A large amount of methanol was added to the reaction mixture to precipitate a polymer. The precipitate was recovered by filtration, washed with water and dried to obtain an epoxidized block copolymer. This copolymer had an epoxy equivalent of 510.

Examples 1 to 16 and Examples 1' to 7'

According to the formulations (in parts by weight) specified in Tables 1 and 2, pelletized resin compositions were each prepared by tumble blending necessary components and melt kneading the obtained blend by the use of an extruder, where a polycarbonate resin made from bisphenol A [a product of Teijin Chemicals, Ltd., Panlite L-1225WP] was used as the polycarbonate resin (a), the above HIPS-1 to 4 were used as the rubber-modified polystyrene resin (b), a styrene-butadiene-styrene block copolymer (I) [SBS, a product of Japan Synthetic Rubber Co., Ltd., TR2000], the above epoxidized block copolymer (II) and maleic anhydride modified styrene/ethylenebutylene/styrene block copolymer (III) [MAH-SEBS, Mn: ca. 100,000, weight ratio of styrene to ethylene-butylene: 30/70, acid value: 10 mgCH$_3$ONa/g] were used as the block copolymer (c), a poly(1,4-cyclohexanedimethylene terephthalate) containing ethylene glycol as a comonomer component [PCTG, a product of Eastman Chemical, Easter DN003] was used as the polyalkylene terephthalate (d), a poly(2,6-dimethyl-1,4-phenylene) ether [a product of GE Specialty Chemicals, Inc., BLENDEX HPP820] was used as the polyphenylene ether resin (e), triphenyl phosphate and a condensed phosphate ester represented by the following chemical formula (III) [a product of Daihachi Chemical Industry Co., Ltd., PX-200] were used as the organophosphorus compound (f), polytetrafluoroethylene [a product of Du Pont-Mitsui Fluorochemicals Co., Ltd., Teflon 6-J] was used as the fluoroethylene polymer (g), and "Cevian V520" [a product of Daicel Chemical Industries, Ltd.) was used as the ABS resin.

Then, these pelletized resin compositions were each molded into test pieces for general physical properties by the use of an injection molding machine (cylinder temp.: 240° C., mold temp.: 60° C.) and examined according to the usual methods. The results are given in Tables 1 and 2.

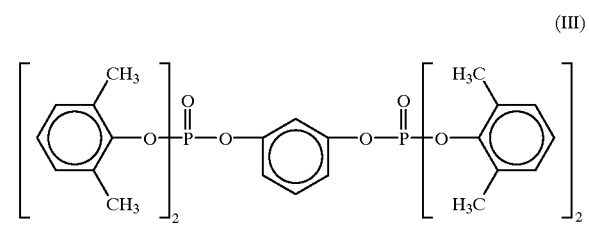

(III)

TABLE 1

|  |  | Ex. | | | | | | | | Ex. | | | |
| --- | --- | --- | --- | --- | --- | --- | --- | --- | --- | --- | --- | --- | --- |
|  |  | 1 | 2 | 3 | 4 | 5 | 6 | 7 | 8 | 1' | 2' | 3' | 4' |
| Components of thermoplastic resin compn. (pt. wt.) | Panlite L-1225WP | 80 | 80 | 80 | 80 | 80 | 80 | 80 | 70 | 80 | 80 | 80 | 80 |
|  | HIPS-1 |  |  |  |  |  |  |  |  | 20 |  |  |  |
|  | HIPS-2 |  |  |  |  |  |  |  |  |  | 20 |  |  |
|  | HIPS-3 | 20 |  | 20 | 20 | 20 | 20 | 20 |  |  |  | 20 |  |
|  | HIPS-4 |  | 20 |  |  |  |  |  | 30 |  |  |  |  |
|  | TR2000 |  |  |  | 3 |  |  |  |  |  |  |  |  |
|  | epoxidized block copolymer | 3 | 3 |  |  | 3 | 3 | 3 | 3 | 3 | 3 |  |  |
|  | MAH-SEBS |  |  |  | 3 |  |  |  |  |  |  |  |  |
|  | Easter DN003 |  |  |  |  |  | 1 |  | 1 |  |  |  |  |
|  | BULENDEX HPP820 |  |  |  |  |  |  | 1 | 1 |  |  |  |  |
|  | Cevian V520 |  |  |  |  |  |  |  |  |  |  |  | 20 |
| Results of evaluation | Izod impact strength (kg · cm/cm) | 72 | 80 | 75 | 68 | 68 | 40 | 36 | 52 | 29 | 42 | 7 | 45 |
|  | Du Pont impact strength (thickness: 2 mm) (kgf · cm) | 50 or above | 50 or above | 50 or above | 50 or above | 50 or above | 50 or above | 50 or above | 50 or above | 10 or below | 10 or below | 10 or below | 50 or above |
|  | Du Pont impact strength (thickness: 1 mm) (kgf · cm) | 17 | 21 | 15 | 14 | 20 | 27 | 24 | 11 | 10 or below | 10 or below | 10 or below | 26 |
|  | flowability (mm) | 115 | 113 | 119 | 117 | 113 | 111 | 109 | 130 | 122 | 121 | 124 | 99 |

TABLE 2

|  |  | Ex. | | | | | | | | Ex. | | |
| --- | --- | --- | --- | --- | --- | --- | --- | --- | --- | --- | --- | --- |
|  |  | 9 | 10 | 11 | 12 | 13 | 14 | 15 | 16 | 5' | 6' | 7' |
| Components of thermoplastic resin compn. (pt. wt.) | Panlite L-1225WP | 80 | 80 | 80 | 80 | 80 | 80 | 80 | 70 | 80 | 80 | 80 |
|  | HIPS-1 |  |  |  |  |  |  |  |  | 20 |  |  |
|  | HIPS-3 | 20 | 20 | 20 | 20 | 20 | 20 | 20 | 30 |  | 20 |  |
|  | TR2000 |  |  |  | 3 |  |  |  |  |  |  |  |
|  | epoxidized block copolymer | 3 | 3 | 3 |  | 3 | 3 | 3 | 3 | 3 |  |  |
|  | Easter DN003 |  |  |  |  |  | 1 |  | 1 |  |  |  |
|  | BULENDEX HPP820 |  |  |  |  |  |  | 1 | 1 |  |  |  |
|  | triphenyl phosphate | 12 | 12 |  | 12 | 12 | 10 | 10 | 14 | 12 | 12 | 12 |
|  | PX-200 |  |  | 15 |  |  |  |  |  |  |  |  |
|  | Teflon 6-J |  | 0.5 | 0.5 | 0.5 | 0.5 | 0.5 | 0.5 | 0.5 | 0.5 | 0.5 | 0.5 |
|  | Cevian V520 |  |  |  |  |  |  |  |  |  |  | 20 |
| Results of evaluation | Izod impact strength (kg · cm/cm) | 42 | 38 | 32 | 45 | 37 | 20 | 15 | 28 | 16 | 3 | 18 |

TABLE 2-continued

|  | Ex. | | | | | | | | Ex. | | |
| --- | --- | --- | --- | --- | --- | --- | --- | --- | --- | --- | --- |
|  | 9 | 10 | 11 | 12 | 13 | 14 | 15 | 16 | 5' | 6' | 7' |
| Du Pont impact strength (thickness: 2 mm) (kgf · cm) | 50 or above | 50 or above | 50 or above | 50 or above | 50 or above | 50 or above | 50 or above | 50 or above | 10 or below | 10 or below | 50 or above |
| Du Pont impact strength (thickness: 1 mm) (kgf · cm) | 13 | 12 | 10 | 14 | 11 | 22 | 20 | 10 | 10 or below | 10 or below | 19 |
| flame retardance (UL94) | V-2 | V-0 | V-0 | V-0 | V-0 | V-0 | V-0 | V-0 | V-0 | V-0 | V-0 |
| flowability (mm) | 225 | 217 | 226 | 222 | 219 | 210 | 212 | 239 | 226 | 230 | 198 |

<Evaluation of the test results>

① The thermoplastic resin composition of the present invention mainly comprising a polycarbonate resin and a specific rubber-modified polystyrene resin is nearly equivalent to a polyblend of a polycarbonate resin with an ABS resin in impact strength, and is superior to the polyblend in flowability (processability during molding).

② The flame-retardant thermoplastic resin composition of the present invention is equivalent to a polyblend of a polycarbonate with an ABS resin having a composition corresponding to that of the resin composition in impact resistance, and is superior to the polyblend in flame retardance and flowability (processability during molding).

It has been proved that these effects can be attained only when the block copolymer (c) is added to a polycarbonate resin composition containing the specific rubber-modified polystyrene resin (b) according to the present invention.

Examples 17 to 23 and Examples 8' to 18'

"Panlite L-1225WP" (a product of Teijin Chemicals, Ltd.) was used as the polycarbonate resin, a high-impact polystyrene (a product of Daicel Chemical Industires, Ltd., "Daicel Styrol S81") was used as the polystyrene resin, a polybutylene terephthalate (a product of Polyplastics Co., Ltd., "Duranex 400FP") and a polyethylene terephthalate (a product of Mitsubishi Rayon Co., Ltd., "Dianite MA-521") were used as the aromatic polyester, and a product obtained by the following process was used as the epoxidized block copolymer. Namely, 300 g of a polystyrene-polybutadiene-polystyrene block copolymer [a product of Japan Synthetic Rubber Co., Ltd., trade name: TR2000] and 1500 g of ethyl acetate were charged into a jacketed reactor fitted with a stirrer, a reflux condenser and a thermometer, followed by dissolution. Then, 169 g of a 30 wt % solution of peroxyacetic acid in ethyl acetate was continuously dropped into the reactor to conduct epoxidation at 40° C. under stirring for 3 hours. The reaction mixture was brought to room temperature and taken out of the reactor. A large amount of methanol was added to the reaction mixture to precipitate a polymer. The precipitate was recovered by filtration, washed with water and dried to obtain an epoxidized block copolymer. This block copolymer had an epoxy equivalent of 510. Further, "Cevian V520" (a product of Daicel Chemical Industries, Ltd.) was used as the ABS resin; triphenyl phosphate, trixylenyl phosphate (a product of Daihachi Chemical Industry Co., Ltd. "PX-130") and a condensed phosphate ester of the above chemical formula (III) (a product of Daihachi Chemical Industry Co., Ltd., "PX-200") were used as the organophosphorus compound; and "Teflon 6-J" (a product of Du Pont-Mitsui Fluorochemicals Co., Ltd.) was used as the fluoroethylene polymer. According to the formulations (in parts by weight) specified in Tables 3 and 4, pelletized resin compositions were each prepared by tumble blending the necessary components and melt kneading the obtained blend by the use of an extruder and molding into test pieces for general physical properties by the use of an injection molding machine (cylinder temp.: 250° C., mold temp.: 60° C.). These test pieces were examined for various properties according to the usual methods. The results are given in Tables 3 and 4.

TABLE 3

(pt. by wt.)

|  | Ex. | | | | | | |
| --- | --- | --- | --- | --- | --- | --- | --- |
|  | 17 | 18 | 19 | 20 | 21 | 22 | 23 |
| Polycarbonate resin*1 | 80 | 80 | 80 | 80 | 80 | 80 | 70 |
| polystyrene resin*2 | 20 | 20 | 20 | 20 | 20 | 20 | 30 |
| aromatic polyester (1)*3 | 1 | 1 | 1 |  | 1 | 1 | 1 |
| aromatic polyester (2)*4 |  |  |  | 1 |  |  |  |
| epoxidized block copolymer*5 | 3 | 3 | 3 | 3 | 3 | 3 | 3 |
| organophosphorus compd. (1)*6 |  | 12 | 12 | 12 |  |  | 13 |
| organophosphorus compd. (2)*7 |  |  |  |  | 14 |  |  |
| organophosphorus compd. (3)*8 |  |  |  |  |  | 15 |  |
| fluoroethylene polymer*9 |  | 0.5 | 0.5 | 0.5 | 0.5 | 0.5 | 0.5 |
| Izod impact strength (kg · cm/cm) | 42 | 14 | 13 | 14 | 12 | 11 | 9 |
| Du Pont impact strength (kgf · cm) | 50 or above | 50 or above | 50 or above | 50 or above | 50 or above | 50 or above | 50 or above |
| flame retardance (UL94) | HB | V-2 | V-0 | V-0 | V-0 | V-0 | V-0 |
| flowability (mm) | 127 | 225 | 220 | 221 | 216 | 224 | 249 |

*1 a product of Teijon Chemicals, Ltd., "Panlite L-1225WP"
*2 a product of Daicel Chemical Industries, Ltd., high-impact polystyrene "Daicel Styrol S81"
*3 a product of Polyplastics Co., Ltd., polybutylene terephthalate "Duranex 400FP"
*4 a product of Mitsubishi Rayon Co., Ltd., polyethylene terephthalate "Dianite MA-521"
*5 a product synthesized in laboratory
*6 a product of Daihachi Chemical Industry Co., Ltd., triphenyl phosphate
*7 a product of Daihachi Chemical Industry Co., Ltd., trixylenyl phosphate "PX-130"
*8 a product of Daihachi Chemical Industry Co., Ltd. having a structure of the chemical formula (III), "PX-200"
*9 a product of Du Pont-Mitsui Fluorochemicals Co., Ltd., "Telfon 6-J"

TABLE 4

| | | | | | | Ex. | | | | | (pt. by wt.) |
|---|---|---|---|---|---|---|---|---|---|---|---|
| | 8' | 9' | 10' | 11' | 12' | 13' | 14' | 15' | 16' | 17' | 18' |
| Polycarbonate resin*1 | 80 | 80 | 80 | 80 | 80 | 80 | 80 | 70 | 80 | 80 | 80 |
| polystyrene resin*2 | 20 | 20 | 20 | 20 | 20 | 20 | 20 | 30 | | | |
| aromatic polyester*3 | | | | 1 | | | | | | | |
| epoxidized block copolymer*5 | | 3 | | | 3 | 3 | 3 | 3 | | | |
| ABS resin*10 | | | | | | | | | 20 | 20 | 20 |
| organophosphorus compd. (1)*6 | | | 12 | 12 | 12 | | | 13 | | 12 | |
| organophosphorus compd. (2)*7 | | | | | | 14 | | | | | |
| organophosphorus compd. (3)*8 | | | | | | | 15 | | | | 15 |
| fluoroethylene polymer*9 | | 0.5 | 0.5 | 0.5 | 0.5 | 0.5 | 0.5 | | 0.5 | 0.5 | |
| Izod impact strength (kg · cm/cm) | 10 | 41 | 3 | 2 | 16 | 12 | 12 | 10 | 45 | 18 | 12 |
| Du Pont impact strength (kgf · cm) | 10 or below | 10 or below | 10 or below | 10 or below | 10 or below | 10 or below | 10 or below | 10 or below | 50 or above | 50 or above | 50 or above |
| flame retardance (UL94) | HB | HB | V-0 | V-0 | V-0 | V-0 | V-0 | V-0 | HB | V-0 | V-0 |
| flowability (mm) | 137 | 129 | 230 | 229 | 224 | 219 | 223 | 248 | 108 | 198 | 171 |

*10 a product of Daicel Chemical Industries, Ltd., "Cevian V520"

<Evaluation of the test results>

① The thermoplastic resin composition of the present invention mainly comprising a polycarbonate resin and a specific rubber-modified polystyrene resin is nearly equivalent to a polyblend of a polycarbonate resin with an ABS resin in impact strength, and is superior to the polyblend in flowability (processability during molding).

② The flame-retardant thermoplastic resin composition of the present invention is equivalent to a polyblend of a polycarbonate with an ABS resin having a composition corresponding to that of the resin composition in impact resistance, and is superior to the polyblend in flame retardance and flowability (processability during molding).

It has been proved that these effects can be attained only when both the epoxidized block copolymer and an aromatic polyester are simultaneously used.

Examples 24 to 28 and Examples 19' to 23'

A high-impact polystyrene "Daicel Styrol S81" (trade name, a product of Daicel Chemical Industries, Ltd.) was used as the polystyrene resin; "Panlite L-1225WP" (trade name, a product of Teijin Chemicals, Ltd.) was used as the polycarbonate resin; "ESBS420" (trade name, a product of Daicol Chemical industries, Ltd.) was used as the epoxidized block copolymer; "Cevian V520" (trade name, a product of Daicel Chemical Industries, Ltd.) was used as the ABS resin; triphenyl phosphate, PX-130 and PX-200 (trade names, products of Daihachi Chemical Industry Co., Ltd.) were used as the organophosphorus compound; and "Teflon 6-J" (trade name, a product of Du Pont-Mitsui Fluorochemicals Co., Ltd.) was used as the fluoroethylene polymer. According to the formulations specified in Table 5, pelletized resin compositions were each prepared by tumble blending the necessary components and melt kneading the obtained blend by the use of an extruder, and molding into test pieces for general physical properties by the use of an injection molding machine (cylinder temp.: 240° C., mold temp.: 60° C.). These test pieces were examined for various properties according to the usual methods. The results are given in Table 5.

TABLE 5

| | Ex. | | | | | Ex. | | | | |
|---|---|---|---|---|---|---|---|---|---|---|
| | 24 | 25 | 26 | 27 | 28 | 19' | 20' | 21' | 22' | 23' |
| Cevian V520 | | | | | | | | | 20 | 20 |
| Daicel Styrol S81 | 20 | 20 | 20 | 20 | 20 | 20 | 20 | 20 | | |
| Panlite L-1225WP | 80 | 80 | 80 | 80 | 80 | 80 | 80 | 80 | 80 | 80 |
| ESBS420 | 5 | 5 | 5 | 5 | 5 | | | | | |
| triphenyl phosphate | | 14 | 14 | | | | 14 | | 14 | |
| PX-130 | | | | 15 | | | | 15 | | 15 |
| PX-200 | | | | | 15 | | | | | |
| Teflon 6-J | | | 0.4 | 0.4 | 0.4 | | 0.4 | 0.4 | 0.4 | 0.4 |
| Izod impact strength | 45 | 10 | 10 | 18 | 12 | 10 | 3 | 4 | 15 | 17 |

TABLE 5-continued

|  | Ex. | | | | | Ex. | | | | |
| --- | --- | --- | --- | --- | --- | --- | --- | --- | --- | --- |
|  | 24 | 25 | 26 | 27 | 28 | 19' | 20' | 21' | 22' | 23' |
| (kg · cm/cm) | | | | | | | | | | |
| flame retardance (UL94) | HB | V-2 | V-0 | V-0 | V-0 | HB | V-0 | V-0 | V-0 | V-0 |
| flowability (mm) | 129 | 237 | 235 | 226 | 196 | 137 | 248 | 240 | 214 | 192 |

<Evaluation of the test results>

① The thermoplastic resin composition of the present invention mainly comprising a polycarbonate resin and a polystyrene resin is nearly equivalent toga polyblend of a polycarbonate resin with an ABS resin in impact strength, and is superior to the polyblend during flowability (processability in molding).

② The flame-retardant thermoplastic resin composition of the present invention is equivalent to a polyblend of a polycarbonate with an ABS resin having a composition corresponding to that of the resin composition in impact resistance, and is superior to the polyblend in flame retardance and flowability (processability during molding).

It has been proven that these effects can be attained only when both the epoxidized block copolymer and a fluoroethylene polymer are simultaneously used.

What is claimed is:

1. A thermoplastic resin composition comprising 100 parts by weight of a mixture comprising 30 to 95% by weight of a polycarbonate resin (a) and 5 to 70% by weight of a high-impact polystyrene resin (b) having a rubber content of 15–25%, a particle size of 0.3–5.0 μm and a gel content of 15–70 wt. % and 0.5 to 20 parts by weight of block copolymers (c) having a polymeric block (A) mainly made from an aromatic vinyl compound and a polymeric block (B) mainly made from a conjugated diene compound, and/or partially hydrogenated derivatives thereof (D) are present in each molecule, 0.1 to 20 parts by weight of a polyphenylene ether resin (e) and 1 to 40 parts by weight of an organophosphorus compound (f) selected from the group consisting of

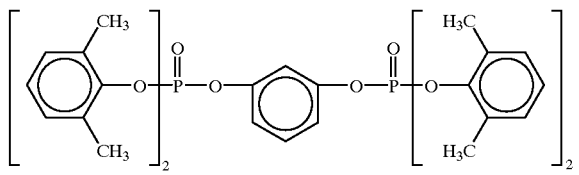

and a mixture of at least one of triphenylphosphate and trixylenylphosphate and

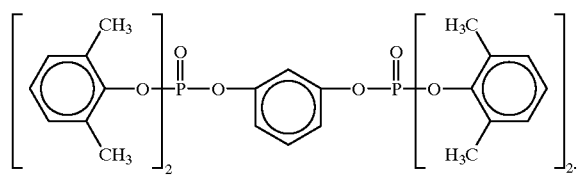

2. The thermoplastic resin composition of claim 1, wherein the organophosphorus compound (f) is

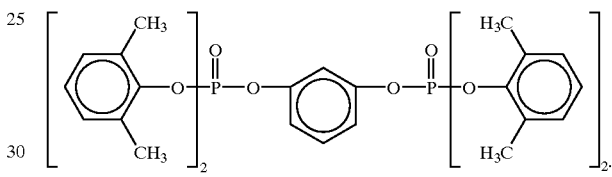

3. The thermoplastic resin composition of claim 1, wherein the organophosphorus compound (f) is a mixture of at least one of triphenylphosphate and trixylenylphosphate and

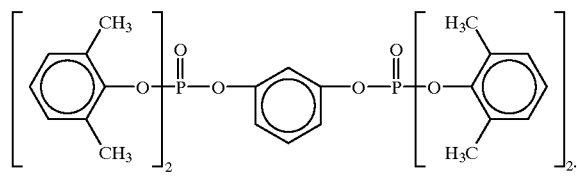

4. The thermoplastic resin composition of claim 1, additionally comprising 0.05 to 5 parts by weight of a fluoroethylene polymer (g).

5. The thermoplastic resin composition of claim 4, wherein the fluoroethylene polymer (g) is polytetrafluoroethylene.

* * * * *